United States Patent [19]

Mizuno et al.

[11] Patent Number: 4,630,484
[45] Date of Patent: Dec. 23, 1986

[54] MASS FLOWMETER

[75] Inventors: Toru Mizuno, Aichi; Sinzi Nanba, Kariya; Kazuma Matsui, Toyohashi; Tsukasa Goto, Toyota, all of Japan

[73] Assignee: Nippondenso Co., Ltd., Kariya, Japan

[21] Appl. No.: 739,004

[22] Filed: May 29, 1985

[30] Foreign Application Priority Data

| May 31, 1984 | [JP] | Japan | 59-112301 |
| Dec. 5, 1984 | [JP] | Japan | 59-256827 |
| Dec. 5, 1984 | [JP] | Japan | 59-256828 |
| Dec. 5, 1984 | [JP] | Japan | 59-256830 |

[51] Int. Cl.$^4$ .............................. G01F 1/32
[52] U.S. Cl. ................................. 73/861.22
[58] Field of Search ........... 73/861.03, 861.22, 861.23, 73/861.24

[56] References Cited

U.S. PATENT DOCUMENTS

| 3,937,195 | 2/1976 | Woods | 73/861.22 |
| 4,116,060 | 9/1978 | Frederick | 73/861.22 |
| 4,280,360 | 7/1981 | Kobayashi et al. | 73/198 |
| 4,297,894 | 11/1981 | Nagaishi et al. | 73/861.03 |
| 4,437,349 | 3/1984 | Joy | 73/861.22 |

FOREIGN PATENT DOCUMENTS 55-51311 4/1980 Japan .
58-144712 8/1983 Japan .

*Primary Examiner*—Herbert Goldstein
*Attorney, Agent, or Firm*—Cushman, Darby & Cushman

[57] ABSTRACT

A mass flowmeter has a vortex generator for shedding a Karman vortex street downstream of the vortex generator positioned inside a duct for guiding a fluid. The vortex generator comprises a stationary member and a movable member which is displaceable in relation to the stationary member. The movable member is displaced by the expanding or contracting of bellows in response to changes in pressure and temperature of the fluid to thereby vary the characteristic dimension of the vortex generator. The Karman vortex shedding frequency of the vortex generator is measured by a heat-wire type sensor.

16 Claims, 10 Drawing Figures

MASS FLOWMETER

BACKGROUND OF THE INVENTION

This invention relates generally to a mass flowmeter for measuring the mass flow of a fluid and, in particular, to a mass flowmeter suitable for measuring the air intake flow of an internal combustion engine.

Karman vortex type flowmeters are known as prior art flowmeters for measuring the air intake flow of an internal combustion engine. This type of flowmeter has a pillar-shaped bluff body which is placed at right angles in the flow for producing a Karman vortex street. The shedding frequency of this Karman vortex street is proportional to the flow velocity of the fluid so, by detecting the vortex street shedding frequency, it is possible to determine the flow velocity, and from this flow velocity it is possible to measure the flow rate.

This kind of Karman vortex type flowmeter has a simple structure and the resistance offered by the bluff body to the flow is low so that this type of flowmeter is very suitable for measuring the flow rate of the air intake of an internal combustion engine.

As is clear from this description, the Karman vortex type flowmeter measures the volumetric flow. However, when measuring the air intake flow of an internal combustion engine, it is desirable to measure mass flow rather than the volumetric flow. The reason for this is that in order to accurately control the air-fuel ratio, it is necessary to detect the mass flow of the intake air to eliminate the effects of changes in intake air pressure and temperature.

Japanese Patent Disclosure No. 51311/80 discloses an intake air detector which is an improvement on the Karman vortex type flowmeter. This intake air detector obtains the mass flow of the fluid by correcting, in response to the density of the fluid, the volumetric flow obtained by the Karman vortex type flowmeter. To elaborate, the prior art intake air flow detector changes the cross-sectional area of the intake pipe and varies the speed of the intake air flow inside the intake pipe in response to the density of the intake air. This kind of a device not only requires means for varying the passage cross-sectional area but also requires sensor means for detecting the density of the intake air, resulting in a complicated and large structure.

U.S. Pat. No. 4,116,060 also discloses a mass flowmeter, which is an improvement on the Karman vortex type flowmeter. This mass flowmeter is different from the intake air flow detector disclosed above. The characteristic dimension of the bluff body can be varied in response to changes in the air density to thereby obtain a value of the Karman vortex shedding frequency which is proportional to the mass flow the air intake. However, with the the mass flowmeter of this U.S. Patent, in making the characteristic dimension of the bluff body variable, the shape of the body also varies greatly so there is a change in the Strouhal number, which affects the Karman vortex shedding frequency. Consequently, the shedding frequency is not accurately proportional to mass flow of the fluid making accurate detection of the mass flow impossible.

SUMMARY OF THE INVENTION

The purpose of this invention is to provide a mass flowmeter which has a simple structure and can accurately detect the mass flow of a fluid.

This object can be obtained by the mass flowmeter of this invention, which comprises:

a vortex generator, which is located in the flow of fluid and produces a Karman vortex street in the downstream side of the flow, the vortex generator being a combination of of a stationary member and a movable member which can be displaced in relation to the stationary member and in a direction perpendicular to the flow of the fluid to thereby make the characteristic dimension of the vortex generator variable in the displacing direction of the movable member;

compensation means for displacing the movable member in relation to the stationary member to thereby vary the characteristic dimension of the vortex generator in response to changes in the pressure and temperature of the fluid; and detection means for detecting Karman vortices produced downstream of the vortex generator.

With the mass flowmeter of this invention, if the characteristic dimension of the vortex generator is made variable in response to changes in the pressure and temperature of the fluid to be measured, the Karman vortex shedding frequency downstream of the vortex generator must be proportional to the mass flow of the fluid. Accordingly, by detecting the Karman vortices, it is possible to easily measure the mass flow of the fluid. Also, according to this invention, variation in the characteristic dimension of the vortex generator is performed by displacing the movable member in relation to the stationary member, so, even though the characteristic dimension is changed, there is very little change in the shape of the vortex generator. Consequently, there is very little change in the Strouhal number which is determined by the vortex generator and its surrounding environment. The result of which is that it is possible to accurately measure the mass flow of a fluid based on the Karman vortex shedding frequency.

According to the preferred embodiment of this invention, bellows which expand and contract due to changes in pressure and temperature of the fluid are used to displace the movable member. This bellows is expanded and contracted in response to the changes temperature and pressure of the fluid inside the bellows. By using this kind of bellows, not only is the construction of the movable member made simple, but it is easy to make the Karman vortex shedding frequency proportional to the mass flow of the fluid to be measured.

Furthermore, according to this invention, the movable and stationary members are provided with their tails extending in the downstream direction, and a connecting passage is formed through the vortex generator extending in the displacing direction of the movable member. The presence of these tail sections and the connecting passage improves the Karman vortex shedding and its growth to thereby generate stable Karman vortex streets downstream of the bluff body. Consequently, it is easy to detect the Karman vortex shedding frequency and thus it is possible to accurately measure the mass flow based on this detection.

BRIEF DESCRIPTION OF THE DRAWINGS

This invention can be better understood with reference to the drawings in which.

DETAILED DESCRIPTION OF THE PREFERRED EMBODIMENTS

Figure 1:
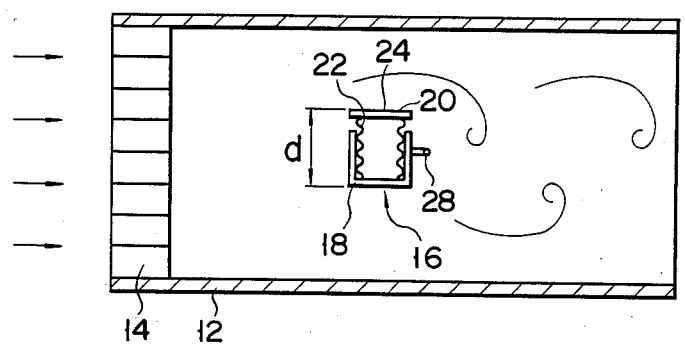
FIG. 1 is a vertical cross section of the mass flowmeter of the first embodiment of this invention.
Figure 2:
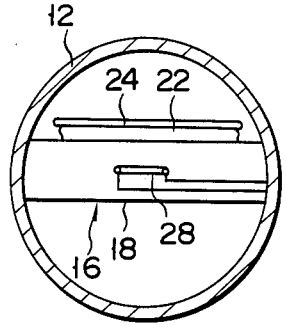
FIG. 2 is a horizontal cross section of the mass flowmeter of FIG. 1.

FIGS. 1 and 2 show a simplified mass flowmeter of the first embodiment of the invention. This mass flowmeter has a duct, such as cylindrical duct 12 forming part of the intake passage of an internal combustion engine, for defining the passage of the fluid whose mass flow is to be detected. A honeycomb flow straightener 14 is positioned in the upstream end of duct 12. (The arrows in FIG. 1 show the direction of intake air flow). Flow straightener 14 is for straightening the intake air in duct 14 into a stationary flow.

Vortex generator 16, which comprises stationary member 18 and movable member 20, is also located in duct 12. Stationary member 18 is formed of a trough-shaped member which radially cuts across the center of duct 12 and has both ends fastened to the inner wall of duct 12. Movable member 20, on the other hand, has bellows 22 expandably located inside the trough of stationary member 18. Bellows 22 is box-shaped and extends in the direction of the trough of stationary member 18. One end of bellows 22 is attached and sealed to the bottom of the trough. The other end of bellows 22 is sealed by plate 24. Bellows 22 contains a prescribed mass of a fluid such as air. With this kind of vortex generator 16, it is possible to vary the characteristic dimension d in a direction at right angles to the intake flow, as shown in FIG. 1, by the expansion and contraction of bellows 22.

Sensor 28 for detecting the shedding frequency of Karman vortices, i.e., the velocity of the vortices, shed by vortex generator 16, is fastened to the end surface of stationary member 18 on the downstream side of the fluid flow. In this case a heat-wire type sensor is used. Power is supplied to the heat wire of sensor 28 to keep the temperature constant. Accordingly, with this kind of sensor 28, an increase in the velocity of the Karman vortices results in an increase in the heat extracted from the heat wire so the value of the power supplied to the heat wire is proportional to the velocity of the Karman vortices, i.e., the Karman vortex shedding frequency. From this power supply value it is possible to detect the Karman vortex shedding frequency. Sensors for detecting the Karman vortex shedding frequency are not limited to heat-wire types; thermistors and other temperature sensors or ultrasonic sensors, or pressure sensors which detect the shedding frequency from changes in pressure of the intake from the generation of Karman vortices may also be used.

The following is a description of the operation of the mass flowmeter shown in FIG. 1.

The intake air guided into duct 12 is straightened into a stationary flow by flow straightener 14. A Karman vortex street is produced in this stationary flow of intake air by vortex generator 16 on the downstream side. It is known that this kind of Karman vortex street satisfies the following condition.

$$f = (St \times U)/d \tag{1}$$

where
f: Karman vortex shedding frequency
St: Strouhal number determined by shape of vortex generator and internal shape of duct close to vortex generator
U: intake air velocity passing vortex generator
d: characteristic dimension of vortex generator Accordingly, by detecting the Karman vortex shedding frequency using equation (1), it is possible to measure the velocity of the intake air and, using equation (2) below, to find volumetric flow Qv from velocity U.

$$Qv = A \times U = ((A=d)/St) \times f \tag{2}$$

where A: passage cross section of duct 12

As was stated earlier, the characteristic dimension d of vortex generator 16 can be varied by the expansion and contraction of bellows 22. This variation of the characteristic dimension d can be determined from volume V1 of bellows 22, which is determined by the equation of state of the air sealed inside bellows 22. Namely, it is possible to determine the volume V1 of bellows 22 from the following equation (3).

$$V1 = (n1 \times R \times T1)/P1 \tag{3}$$

where
n1: mol number of air sealed in bellows
P1: air pressure inside bellows
T1 temperature of the air
R: gas constant Accordingly, if the transverse area of movable member 20 of vortex generator 16, i.e., the area of end plate 24 of movable member 20, is taken to be S, then, based on equation (3), it is possible to find characteristic dimension d using the following equation (4).

$$d = V1/S \tag{4}$$

If equation (3) is transposed into equation (4), characteristic dimension d can be expressed by equation (5) as follows.

$$d = ((n1 \times R \times T1)/P1)/S \tag{5}$$

In this case, temperature T1 and pressure P1 of the air inside bellows 22 vary according to changes in temperature T2 and pressure P2 of the intake air, so equation (5) can be rewritten as the following equation (6).

$$d = C1 \times ((n1 \times R \times T)/P)/S \tag{6}$$

where C1: proportional constant

If the unit volume of the air flowing in duct 12 is taken to be V2 and the mol number included in V2 is n2, then the density ρ of the air can be shown by the following equation (7).

$$\rho = n2/V2 \tag{7}$$

If equation (7) is replace with $V2=(n2\times R\times T2)/P2$, then equation (7) can be rewritten as equation (8) below.

$$\rho = n2/((n2\times R\times T2)/P2) = P2/(R\times T2) \tag{8}$$

Accordingly, based on equations (2) and (8), mass flow Qm of the intake air flowing in duct 12 can be expressed by the following equation (9).

$$\begin{aligned}Qm &= \rho \times Qv \\ &= (P2/(R\times T2))\times(((A\times d)/St))\end{aligned} \tag{9}$$

If equation (5) is transposed into equation (9) the following equation (10) results.

$$Qm\times[((A\times n1)/(St\times S))\times(P2/P1)\times(T1/T2)]\times f \tag{10}$$

The pressure P1 and temperature T1 of the air in bellows 22 varies in accordance with intake pressure P2 and temperature T2 so the variables P1, P2, T1, T2 are mutually cancelled out. Also, together with the change is characteristic dimension d of vortex generator 16, the Strouhal number is theoretically changed. However, movable member 20 of vortex generator 16 is comprised of a simple structure of bellows 22 and end plate 24, so, even if dimension d varies, there is only a relative change in the shape of vortex generator 16; the basic shape of vortex generator 16 always remains the same. Accordingly, even if the characteristic dimension d changes, there is virtually no change in the Strouhal number St. Also, intake air pressure P2 and temperature T2 in an internal combustion engine do not, in practice, vary by more than 500–800 mmHg and −40°–100° C. so the change ratio in characteristic dimension d is slight and the change in the Strouhal number negligible.

Therefore, in equation (10) it is possible to rewrite the values inside the brackets [] as the constant C2. Namely, equation (10) becomes the following equation (11).

$$Qm = C2\times f \tag{11}$$

Consequently, as is clear from equation (11), the Karman vortex shedding frequency f detected by sensor 28 becomes a value that is proportional to mass flow Qm inside duct 12 so it is possible to accurately measure mass flow Qm from this vortex shedding frequency f.

Figure 3:
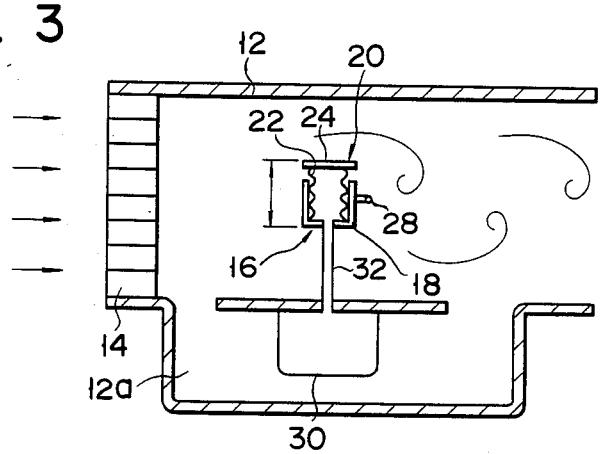
FIGS. 3 to 5 are cross sections of the second to fourth embodiments of this invention.

The following is a description with reference to FIG. 3 of the mass flowmeter of the second embodiment. This mass flowmeter is basically the same as that shown in FIG. 1 and only the differences will be discussed. Bypass passage 12a is provided in duct 12 for bypassing vortex generator 16. Compensation vessel 30 is located inside bypass passage 12a and is connected to bellows 22 via connecting pipe 32 which passes through the bottom of stationary member 18 and the inner wall of duct 12. A fluid having a prescribed mol number is sealed inside compensation vessel 30, connecting pipe 32 and bellows 22. With the mass flowmeter shown in FIG. 3, the reason for providing compensation vessel 30 is as follows. Namely, with the mass flowmeter of FIG. 1, the spring constant of bellows 22 was made small enough to be negligble. If, however, the spring constant of bellows 22 is assumed to be K and bellows 22 expands by δ, then the dynamic equilibrium operating on end plate 24 of movable member 18 can be expressed as follows.

$$P2\times S = P1\times S - K\times\delta \tag{12}$$

Accordingly, as is clear from equation (12), pressure P1 in bellows 22 stops varying proportionately to the changes in intake pressure P2. Consequently, in equation (11), it is not possible to simply replace the values within brackets [] with the constant C2.

However, with the mass flowmeter in FIG. 3, compensation vessel 30 is connected to bellows 22 via pipe 32 so pressure P3 inside bellows 22 is increased over pressure P1 by pressure ΔP which is determined by the volume of connecting pipe 32 and compensation vessel 30. Namely, in the embodiment shown in FIG. 3, the dynamic equalibrium operating on end plate 24 of movable member 18 can be expressed as follows.

$$\begin{aligned}P2\times S &= P3\times S - K\times\delta \\ &= P1\times S + \Delta P\times S - K\times\delta\end{aligned} \tag{13}$$

Accordingly, if the volume of connecting pipe 32 and compensation vessel 30 is set such that the minimum value becomes $e=\Delta P\times S-K\times\delta$, it is possible to directly measure the mass flow Qm of intake air from the Karman vortex shedding frequency, the same as with the mass flowmeter of FIG. 1.

With the mass flowmeter shown in FIG. 3, the reason for locating compensation vessel 30 inside bypass passage 12a is to keep the temperature of the air surrounding bellows 2 equal to that surrounding compensation vessel 30. Accordingly, if the ambient air temperature of bellows 22 is not affected by the heat from the engine and is the same temperature as the external air, it is possible to place compensation vessel 30 in an exposed location outside. This makes it possible to eliminate bypass passage 12a.

Figure 4:
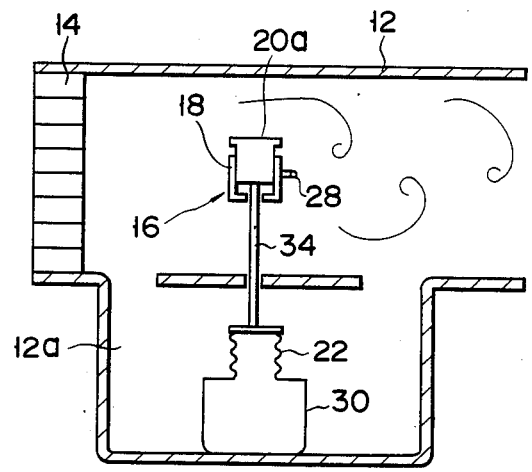

The following is a description in conjunction with FIG. 4 of a third embodiment of this invention. The mass flowmeter of FIG. 4 is basically the same as that of FIG. 3; only, in this case, movable member 20a is formed of a square rod inserted in the groove of stationary member 18 sliding in a vertical direction in the drawing. On the other hand, compensation vessel 30 is located in bypass passage 12a and bellows 22 is connected directly to it. End plate 24 of bellows 22 is coupled to movable member 20a via coupling bar 34, which passes through the floor of stationary member 18 and the inner wall of duct 12. This mass flowmeter, the expansion and contraction of bellows 22 is transmitted to movable member 20a via coupling bar 34 to thereby vary the characteristic dimension d of vortex generator 16. This kind of mass flowmeter obviously has the same functions as the mass flowmeter of FIG. 3.

Figure 5:
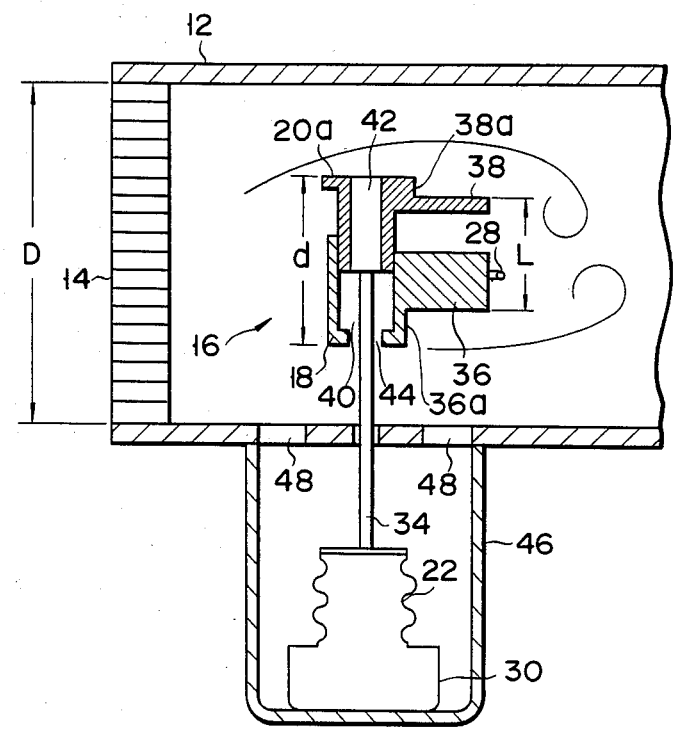

The following is a description in conjunction with FIG. 5 of a fourth embodiment of this invention. Vortex generator 16 of this mass flowmeter is a further modification of the vortex generator shown in FIG. 4. With this mass flowmeter, a tail portion 36 is formed extending downstream on the downstream end surface of stationary member 18. A similar tail portion 38 is formed on the end surface of movable member 20a and comes together with tail portion 36 when characteristic dimension d is the minimum. Distance L between tail portions 36 and 38, which are at right angles to the air flow, is set to be less than characteristic dimension d of vortex generator 16 regardless of the changes in characteristic dimension d, by forming steps 38a and 36a between the upper surface of movable member 20a and the upper surface of tail portion 38 and between the lower surface of stationary member 18 and the lower surface of tail portion 36.

Furthermore, communication hole 40 extends in the displacing direction of movable member 20a for communication between the upper and lower intake air of vortex generator 16. Communication hole 40 is formed of through hole 42 in movable member 20a, the groove of stationary member 18 and opening 44 formed in the bottom wall of stationary member 18. Communication hole 40 also extends at right angles to the displacing direction of movable member 20a and the dimensions in this direction of communication hole 40 and the widths of tail portions 36 and 38 are the same.

Bellows 22 and compensation vessel 30, which are connected to movable member 20a via coupling bar 34, are arranged in a housing 46 which is attached to the outside wall of duct 12 and normally in communication with duct 12 via the two openings 48 formed in duct 12 inside housing 46.

With the embodiment shown in FIG. 5, if the internal dimension of duct 12 in the displacing direction of movable member 20a is taken to be D, the relation between D and characteristic dimension d of vortex generator 16 is set at $d/D \leq 0.2$. If duct 12 is cylindrical, D corresponds to the internal diameter of duct 12.

With this kind of mass flowmeter, it is possible to detect the Karman vortex shedding frequency with even greater accuracy. Namely, the intake air strikes vortex generator 16 and this causes the intake air flow to flow faster near the upper surface of vortex generator 16 than the intake air flowing at the lower surface of vortex generator 16 at the moment when Karman vortices start to shed at the upper side of vortex generator 16, as is shown in FIG. 5. Consequently, the pressure of the air flowing near the top of vortex generator 16 is lower than that flowing near the bottom, so part of the air flowing near the bottom of vortex generator 16 starts to flow toward the upper surface of vortex generator 16 via communication hole 40. The direction of flow inside communication hole 40 is at right angles to the flow of intake air over the upper surface of vortex generator 16 so the air flow from communication hole 40 pushes the air flow on the upper surface outward. The intake air flow which is pushed outward in this way is bent toward the vortex generator 16 by the air flow on the outside and then further bent toward the step 38a of movable member 20a. This air flow acts as the core of a Karman vortex. The core of the vortex flows along tail portion 38 of movable vortex generator 20a to gradually grow. Consequently, there is sufficient growth in the downstream side of vortex generator 16 and the shedding of Karman vortices is strong and stable.

On the other hand, after a Karman vortex has been generated on the upper side of vortex generator 16, a vortex is generated on the lower side. The shedding of this vortex is the same as for the vortex on the upper side so there is also sufficient, strong and stable shedding of Karman vortices on the lower side of vortex generator 16.

Accordingly, if vortex generator 16 of FIG. 5 is used, it is possible to reliably detect the Karman vortex shedding frequency using sensor 28 and to accurately measure the mass flow Qm. Also, with this particular vortex generator, even if there are variations in the characteristic dimension, there is little change in shape so accurate measurement of mass flow Qm is possible in the same as for the vortex generator mentioned earlier.

Figure 6:
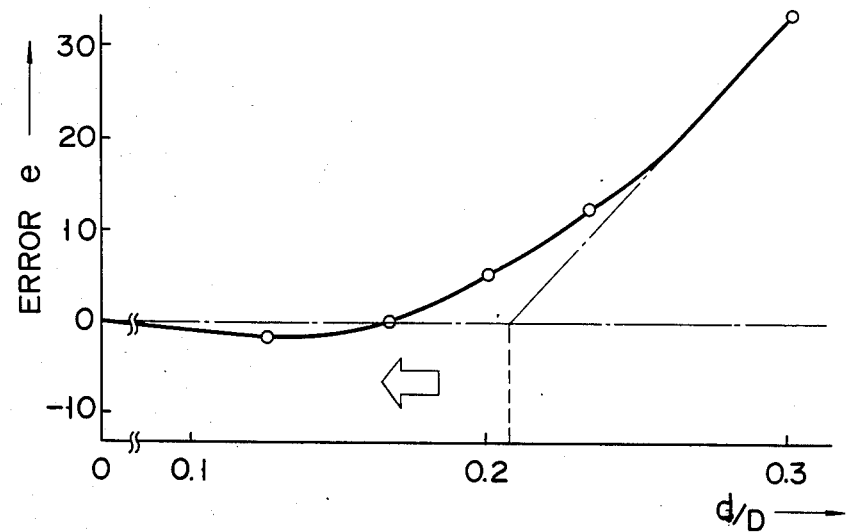
FIG. 6 shows the relationship of the ratio between characteristic dimension d and the duct internal diameter D, i.e., d/D and the error between the experimental values and the theoretical values of the Karman vortex shedding frequency.

According to the embodiment shown in FIG. 5, the internal dimension D of duct 12 in the displacing direction of movable member 20a is related to characteristic dimension d of vortex generator 16 such that $d/D \leq 0.2$ so it is possible to further increase the accuracy of the Karman vortex shedding frequency. FIG. 6 shows the relation of the error e between the Karman vortex shedding frequency obtained from equation (1) and the Karman vortex shedding frequency obtained by experiment and the ratio d/D. As is clear from FIG. 6, when the ratio d/D becomes more than 0.2, error e beomes extremely large. The reason for this is as follows. When characteristic dimension d increases and as a result the distance between movable member 20a and the inner wall of duct 12 becomes short, the air flow on the upper side of vortex generator 16 is forcibly bent to the inside by the presence of the inner wall of duct 12. Accordingly, even if characteristic dimension d of vortex generator 16 is increased, the air flow is suppressed as if the characteristic dimension d were kept small so the velocity of intake air and the Karman vortex shedding frequency become disproportionate.

Therefore, if the relation between internal dimension D of duct 12 and characteristic dimension d of vortex generator 16 is set at $d/D \leq 0.2$, there is virtually no effect from error e, making it possible to obtain an accurate mass flow Qm measurement.

Figure 7:
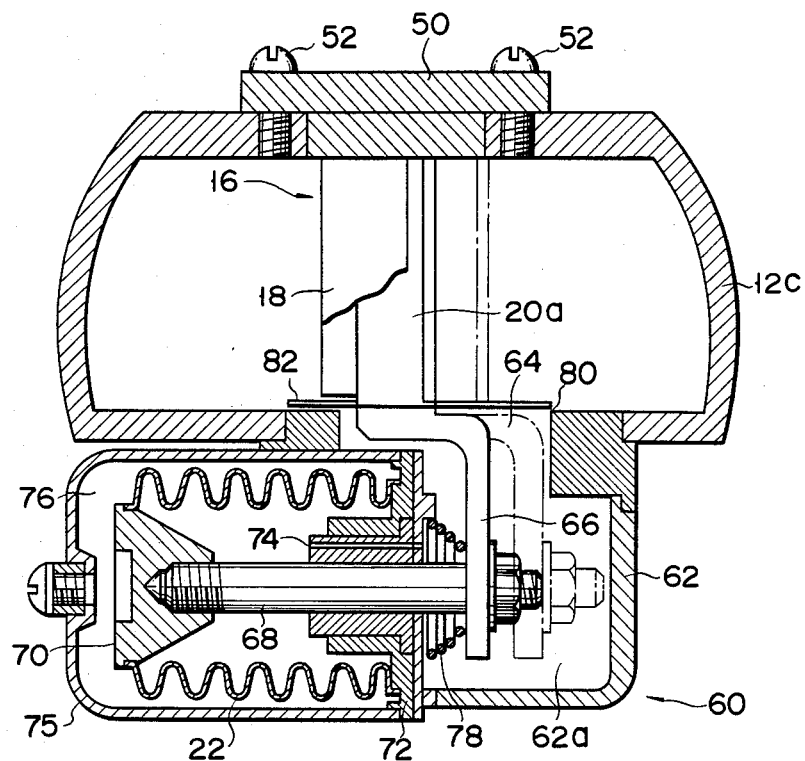
FIG. 7 is a cross section of the mass flowmeter according to a fifth embodiment of this invention.
Figure 8:
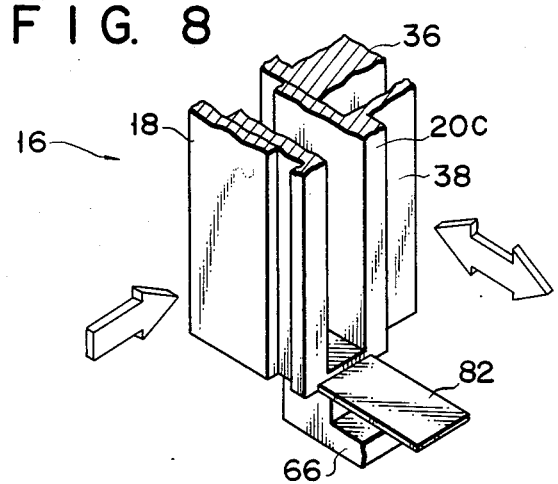
FIG. 8 is a perspective view of part of the bluff body used in the mass flowmeter shown in FIG. 7.

FIG. 7 shows greater detail of the mass flowmeter of FIG. 5 as the fifth embodiment of this invention. With the mass flowmeter shown in FIG. 7, duct 12c is not round but rather has a rectangular cross section. Vortex generator 16, which is the same as the vortex generator of the FIG. 5 embodiment, is provided in duct 12c. FIG. 8 shows a perspective view of a part of vortex generator 16. One end of vortex generator 16 is fastened to the external walls of duct 12c by plate 50 and bolts 52 and drive unit 60 for expanding and contracting is attached to the other external wall of duct 12c on the opposite side. Drive unit 60 for displacing movable member 20a is fastened to the external wall of duct 12c and has a first housing 62 which defines chamber 62a therein. Chamber 62a communicates with duct 12c via opening 64 formed in the external wall of duct 12c. Arm 66 extends from movable member 20a into chamber 62a. Rod 68, which extends in the displacing direction of movable member 20a, is attached at one end to arm 66. Rod 68 extends into bellows 22 and is attached to end plate 70 at the other end of bellows 22. Namely, rod 68 extends into bellows 22 through end plate 72 at one end of bellows 22 which sealed to the external wall of first housing 62. Furthermore, orifice 74 for communicating chamber 62a, i.e., duct 12c with the inside of bellows 22 is formed in end plate 72.

A cup-shaped second housing 75 with one end open is provided on the outside of bellows 22 to encompass bellows 22. The open end of second housing 75 is fastened to and sealed by end plate 72. Namely, airtight space 76 is formed on the outside of bellows 22 defined by second housing 75. Air having a prescribed mol number is sealed in this airtight space 76. Second housing 75 is fastened to the the outer wall of duct 12c. Therefore, the chamber 62a is defined by the internal surface of first housing 62, part of the external wall of second housing 75 and end plate 72.

A coil spring having nonlinear characteristics, such as conical coil spring 78, is provided between end plate 72 and arm 66. Coil spring 78 compensates the characteristic dimension d of vortex generator 16 so as to prevent it from over-decreasing the dimension d when the pressure in the duct 12c becomes higher than a predetermined value.

Cover 82 for covering opening 64 of duct 12c is integrally mounted on the movable member 20a so as to cover the opening 64 regardless of the position of movable member 20a. There is a gap 80 between the cover 82 and the inner wall of duct 12c.

With this kind of mass flowmeter, the same as with the embodiment described earlier, the pressure and temperature inside bellows 22 varies together with the pressure and temperature of the intake air flow in duct 12c, thereby making it possible to vary characteristic dimension d of vortex generator 16. This in turn makes it possible to detect the Karman vortex shedding frequency, which is proportionate to mass flow Qm of the intake air. Also, with the embodiment shown in FIG. 7, chamber 62a and the inside of bellows 22 are in communication via orifice 74 so, even if mechanical vibrations are transmitted to bellows 22, there is no possibility of unwanted expansion or contraction of bellows 22. Accordingly, there is no effect from outside vibrations and stable maintenance of dimension d of vortex generator 16 is possible.

According to the embodiment of FIG. 7, the spring characteristic of bellows 22 is completely cancelled by the airtight space 76 provided in the second housing 75 when the pressure in the airtight space 76 is a predetermined value (for example 760 mmHg).

The actual characteristic dimension d of vortex generator 16 does not coincide with the required characteristic dimension of vortex generator 16 when the pressure in the airtight space 76 becomes higher or lower than a predetermined value. However, the characteristic dimension d of vortex generator 16 can be compensated by the coil spring 76 described above so as to come near the required characteristic dimension. Thus, it is possible to accurately detect mass flow Qm.

Furthermore, with the embodiment of FIG. 7, opening 64 of duct 12c is covered by cover 82 so the intake flow near vortex generator 16 in duct 12c is not disturbed by the presence of opening 64. Accordingly, there is a regular shedding of Karman vortices which makes it possible to reliably detect the shedding frequency using sensor 28.

Figure 9:
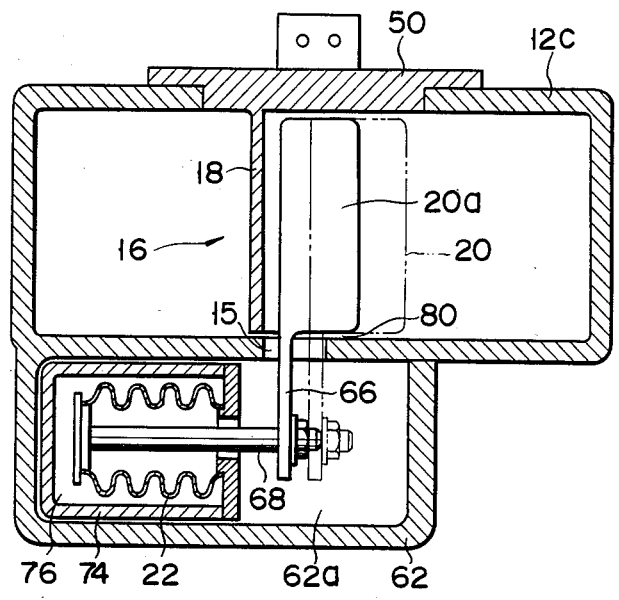
FIG. 9 is a transverse section of a mass flowmeter according to a sixth embodiment.
Figure 10:
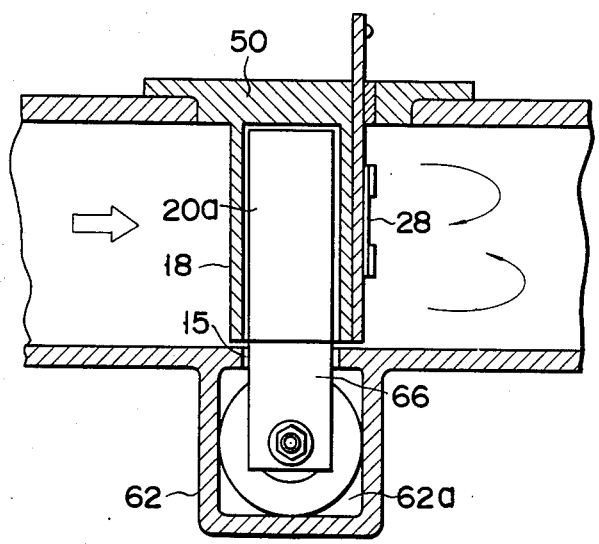
FIG. 10 is a vertical cross section of the mass flowmeter shown in FIG. 9.

Finally, FIGS. 9 and 10 show a sixth embodiment of this invention. The sixth embodiment has the same basic structure as the mass flowmeter of FIG. 7. In this case, however, a vortex generator 16 the same as the vortex generator shown in FIG. 4 is used. With the sixth embodiment, gap 80 is covered by vortex generator 16 itself, as is shown in FIGS. 9 and 10. With this kind of arrangement it is possible to eliminate cover 82 which was used in the embodiment of FIG. 7.

What is claimed is:

1. A mass flowmeter for measuring the mass flow of a fluid, comprising:
    a vortex generator, which is placed in the flow of a fluid, for shedding a Karman vortex street downstream of the vortex generator, said vortex generator including a stationary member having a trough extending in a direction at right angles to the flow of the fluid and a movable member located inside said trough and including a bellows for expanding and contracting in response to changes in the pressure and temperature of the fluid, the movable member being displaceable in a direction at right angles to the flow of the fluid to thereby vary a characteristic dimension of said vortex generator;
    compensation means for displacing the movable member in relation to the stationary member in response to changes in pressure and temperature of the fluid to vary the characteristic dimension of said vortex generator; and
    detection means for detecting Karman vortices generated downstream of said vortex generator.

2. A mass flowmeter according to claim 1, further comprising a flow straightener, placed in the flow of a fluid, for straightening the fluid flow into a stationary flow, said flow straightener being disposed on the upper stream side of said vortex generator.

3. A mass flowmeter according to claim 1, wherein said compensation means includes an airtight vessel whose inside communicates with the inside of the bellows and whose internal pressure and temperature vary in response to changes in the pressure and temperature of the fluid.

4. A mass flowmeter according to claim 3, wherein said mass flowmeter includes a duct, for leading the flow of fluid, in which said vortex generator is located, and which further includes an auxiliary duct connected to the duct so as to bypass said vortex generator, the auxiliary duct housing said airtight vessel.

5. A mass flowmeter for measuring the mass flow of a fluid, comprising:
    a duct for leading the flow of fluid;
    a vortex generator, which is located inside said duct, for shedding a Karman vortex street downstream of said vortex generator, and which has an opposing surface facing the flow of fluid, said vortex generator including a stationary member, which has a tail portion extending in the downstream direction, and a movable member having a tail portion extending downstream adjacent the stationary member, the movable member being displaceable in relation to the stationary member in a direction at right angles to the flow of the fluid to thereby vary a characteristic dimension of said vortex generator, and including a passage defined along the displacing direction of the movable member through said vortex generator whereby opposite sides of said vortex generator from which vortices are shed are in communication with each other;
    compensation means for displacing the movable member in relation to the stationary member in response to changes in pressure and temperature of the fluid to vary the characteristic dimension of said vortex generator; and
    detection means for detecting Karman vortices generated downstream of said vortex generator.

6. A mass flowmeter according to claim 5, wherein said compensation means includes a bellows which expands and contracts in response to changes in pressure and temperature of the fluid, coupling means for coupling the movable end of the bellows and the movable member, and an airtight vessel communicating with the inside of the bellows.

7. A mass flowmeter according to claim 5, wherein said compensation means includes a bellows which expands and contracts in response to changes in pressure and temperature of the fluid, coupling means for coupling the movable end of the bellows and the movable member, and an airtight vessel which houses the bellows.

8. A mass flowmeter according to claim 7, wherein said coupling means includes a communicating housing fastened to the outside of said duct for defining a chamber therein together with a fixed end of the bellows, said chamber communicating with the inside of ,aid duct via an opening formed on the external wall of said duct, and an arm extending from the movable member into the communicating housing via the opening, and a coupling bar attached at one end to said arm, the other end of the coupling bar airtightly extending into the bellows through the fixed end of the bellows and being attached to the movable end of the bellows.

9. A mass flowmeter according to claim 8, wherein an orifice, by which the inside of the bellows and the chamber of the communicating housing communicate, is formed in the fixed end of the bellows.

10. A mass flowmeter according to claim 8, further comprising a coil spring having nonlinear spring characteristics for preventing over-expansion or over-contraction of the bellows when the pressure in the airtight vessel becomes higher or lower than the pressure of the fluid so that the spring characteristic of the bellows, which is determined by the volume of the airtight vessel, is nullified by the coil spring.

11. A mass flowmeter according to claim 8, wherein a cover is attached to the movable member in said duct to cover the opening of said duct regardless of the position of said movable member, a small gap being defined between the cover and the internal wall of said duct.

12. A mass flowmeter according to claim 8, wherein said vortex generator is positioned such that the opening of said duct is covered regardless of the position of the movable member, a small gap being defined between said vortex generator and the inner wall of said duct.

13. A mass flowmeter according to claim 5, wherein if the characteristic dimension of said vortex generator is d and the internal measurement of said duct in the displacing direction of movable member is D, the following relation is satisfied, $d/D \leq 0.2$.

14. A mass flow meter according to claim 5, further comprising a flow straightener, placed in the flow of a fluid, for straightening the fluid flow into a stationary flow, said flow straightener being disposed on the upper stream side of said vortex generator.

15. A mass flowmeter for measuring the mass flow of a fluid, comprising:
a vortex generator, which is placed in the flow of a fluid, for shedding a Karman vortex street downstream of the vortex generator, said vortex generator including a stationary member having a trough extending in a direction at right angles to the flow of the fluid and a movable member located inside said trough, the movable member being displaceable in a direction at right angles to the flow of the fluid to thereby vary a characteristic dimension of said vortex generator;
compensation means for displacing the movable member in relation to the stationary member in response to changes in pressure and temperature of the fluid to vary the characteristic dimension of said vortex generator; and
detection means for detecting Karman vortices generated downstream of said vortex generator.

16. A mass flowmeter according to claim 15, further comprising a flow straightener, placed in the flow of a fluid, for straightening the fluid flow into a stationary flow, said flow straightener being disposed on the upper stream side of said vortex generator.

* * * * *